(12) United States Patent
Ray et al.

(10) Patent No.: US 8,540,826 B2
(45) Date of Patent: Sep. 24, 2013

(54) METHOD OF SURFACE TREATMENT OF ALUMINUM FOIL AND ITS ALLOY AND METHOD OF PRODUCING IMMOBILIZED NANOCATALYST OF TRANSITION METAL OXIDES AND THEIR ALLOYS

(75) Inventors: Srimanta Ray, Windsor (CA); Jerald A. D. Lalman, Windsor (CA)

(73) Assignee: University of Windsor, Windsor (CA)

( * ) Notice: Subject to any disclaimer, the term of this patent is extended or adjusted under 35 U.S.C. 154(b) by 365 days.

(21) Appl. No.: 12/923,688

(22) Filed: Oct. 4, 2010

(65) Prior Publication Data

US 2011/0287926 A1 Nov. 24, 2011

Related U.S. Application Data

(60) Provisional application No. 61/272,518, filed on Oct. 2, 2009.

(51) Int. Cl.
  *C23C 22/78* (2006.01)
  *C23C 22/56* (2006.01)
  *C23C 8/10* (2006.01)

(52) U.S. Cl.
  USPC ........... 148/285; 148/240; 148/243; 148/275; 148/277; 148/14.05; 148/14.12

(58) Field of Classification Search
  USPC ................. 148/285, 240, 243, 275, 277, 284; 106/14.05, 14.12
  See application file for complete search history.

(56) References Cited

U.S. PATENT DOCUMENTS

| | | | |
|---|---|---|---|
| 3,284,326 | A | 11/1966 | Sodium |
| 3,314,890 | A | 4/1967 | Smith |
| 3,407,141 | A | 10/1968 | Hagerty |
| 3,616,310 | A | 10/1971 | Dorsey |
| 3,802,973 | A | 4/1974 | Smith |
| 3,898,095 | A | 8/1975 | Berdan |
| 4,395,305 | A | 7/1983 | Whitman |
| 5,106,653 | A | 4/1992 | Platts |
| 5,513,766 | A | 5/1996 | Ranieri et al. |
| 7,892,447 | B2 | 2/2011 | Maddan |
| 2007/0269655 | A1 | 11/2007 | Joo et al. |
| 2008/0149885 | A1 | 6/2008 | Lin et al. |
| 2008/0242178 | A1 | 10/2008 | Reneker |
| 2009/0068466 | A1 | 3/2009 | Komura et al. |

FOREIGN PATENT DOCUMENTS

| | | |
|---|---|---|
| EP | 1475452 A2 | 11/2004 |
| EP | 2031613 A2 | 9/2006 |
| JP | 2007-273903 | * 10/2007 |
| WO | WO 01/27365 A1 | 4/2001 |

(Continued)

OTHER PUBLICATIONS

Wegman. R. F. (1989). Surface preparation and techniques for adhesive bonding. Noyes Pub. Westwood, NJ. Chapter 2: Aluminum and aluminum alloys, pp. 9-24.

(Continued)

*Primary Examiner* — Lois Zheng

(57) ABSTRACT

A process for surface treatment of aluminium foils includes steps of applying an etching solution to chemically etch at least one surface of the foil to form an etched surface, and forming an aluminium oxidized coating on the etched surface. The etching solution comprises an aqueous solution which includes hydrogen peroxide as an oxidant and sulfuric, orthophosphoric or nitric acid.

7 Claims, 10 Drawing Sheets

(56) References Cited

FOREIGN PATENT DOCUMENTS

| WO | WO 2006/093553 A3 | 9/2006 |
| WO | WO 2008/028194 A2 | 3/2008 |
| WO | WO 2008/111960 A2 | 9/2008 |

OTHER PUBLICATIONS

Fierro, J.L.G. (2006). Metal oxides: chemistry and application. CRC Press. Boca Raton, FL. pp. 31-48, 463-481.

Hagens, J. (2006). Industrial catalysis: A practical approach. 2nd Edn. J. Wiley and Sons Inc. Weinheim, Germany. pp. 99-177.

Carp, O., Huisman, C.L., Reller, A. (2004). Photoinduced reactivity of titanium dioxide. Progress in Solid State Chemistry, Augsburg, Germany 32, 33-177.

Ibañez, P.F., Malato, S., Enea, O. (1999). Photoelectrochemical reactors for the solar decontamination of water. Catalysis Today, Poitiers, France 54, 329-339.

Houari, M., Saidi, M., Tabet, D., Pichat, P., Khalaf, H. (2005). The Removal of 4-chlorophenol . . . as Photocatalyst. American Journal of Applied Sciences 2, 7, 1136-1140.

Subbiah, T., Bhat, G.S., Tock, R.W. , Parameswaran, S., Ramkumar, S.S. (2005). Electrospinning of Nanofibers. Journal of Applied Polymer Science, 96, 2, 557-569.

Li, D., Wang, Y., Xia, Y.; (2003). Electrospinning of Polymeric and ceramic nanofibers as uniaxially aligned arrays. Nano Letters, Washington, 3, 8, 1167-1171.

Viswanathamurthi, P., Bhattarai, N., Kim, C.K., Kim, H.Y., Lee, D.R. (2004). Ruthenium doped TiO2 fibers by electrospinning. Inorganic Chemistry Communications, 7, 679-682.

Son, W.K., Cho, D., Park, W.H. (2006). Direct electrospinning of ultrafine titania fibres in the absence of polymer . . . titania fibres. Nanotechnology, 17, 439-443.

Cui, X.M., Nam, Y.S., Lee, J.Y., Park, W.H. (2008). Fabrication of zirconium carbide (ZrC) ultra-thin fibers by electrospinning. Materials Letters, 62, 12-13, 1961-1964.

Tappmeyer, W.P., Davidson, A.W. (1963). Cobalt and nickel acetates in anhydrous acetic acid. Inorganic Chemistry, 2, 4, 823-825.

* cited by examiner

METHOD OF SURFACE TREATMENT OF ALUMINUM FOIL AND ITS ALLOY AND METHOD OF PRODUCING IMMOBILIZED NANOCATALYST OF TRANSITION METAL OXIDES AND THEIR ALLOYS

RELATED APPLICATIONS

This application claims the benefit of 35 USC §119(e) to U.S. Provisional Patent Application Ser. No. 61/272,518, filed Oct. 2, 2009 entitled "Method of Surface Treatment of Aluminum Foil and Its Alloy and Method of Producing Immobilized Nanocatalyst of Transition Metal Oxides and Their Alloys", the entire disclosure of which is incorporated herein by reference.

FIELD OF THE INVENTION (A) In a first aspect, the present invention relates to surface etching and more particularly to a process for the surface treatment of aluminum and aluminum alloys.

(B) In another aspect, the invention also relates to a method of producing immobilized nanocatalyst of transition metals and transition metal alloys. More particularly, the present invention relates to the production of ultrafine immobilized nanofibers for use with a supported metal catalyst.

BACKGROUND OF THE INVENTION (A) Surface Treatment of Foils

Surface etching of aluminum and the formation of an oxide layer on the aluminum surface is known to prevent corrosion and increase the adhesion of additives, paints and colors onto the aluminium surface. Surface etching is commonly accomplished galvanostatically, whereby the surface of an aluminum foil/sheet is electrochemically modified by the combined use of a strong acid and a source of electricity. This method is also known as anodization.

Galvanostatic anodization is an energy intensive process. Moreover, in cases of processing thin aluminum foils, if the process is not controlled properly, the resultant anodized foil becomes brittle and crumbles. On the other hand, chemical etching of thin aluminum foils, under less controlled conditions damages the foil and creates holes within the foil material.

Etching of aluminum by wet treatment is conventionally used by aluminum finishers. Typical etching solutions comprise strong acids or an alkali metal hydroxide, usually sodium hydroxide, and a chelating agent.

(B) Production of Ultrafine Metal Oxide Nanofibres

Supported metal oxides are known to be used in several industrial, manufacturing commercial and environmental remediation processes. Transition metal oxides are useful in variety of applications such as catalytic synthesis of organic compounds and petroleum cracking. Catalytic performance in many of these processes is influenced by the catalytic surface area. Thus, nanometric sized catalytic particles is of significant commercial interest.

Using nanoparticles in form of a slurry requires a solid/liquid separation process to recycle the catalyst. The settling velocity of the nanoparticles is very slow, by virtue of higher surface area, and use of conventional gravity separators will result in long settling times which would likely result in uneconomical designs. Using a forced filtration process is possible, however energy is required for operation of a pumping system. Also, in most cases the presence of any remnant catalyst particle in the process stream is highly undesirable. Human exposure from handling the process stream during the slurry preparation process posses major occupational and safety problems.

Minimizing the limitations associated with using a slurry of catalyst particles has led to the development of immobilizing the catalyst particles onto a support medium. Chemical vapour deposition or coating a surface by dip coating with a slurry of nanoparticles and subsequently immobilizing the particles through thermal stabilization are the popular methods of producing a supported catalyst system. A major bottleneck of many catalyst supporting methods are related to the loss of surface area which is caused by the sintering or aggregation of the nano-catalyst onto the support surface during thermal treatment. Particle sintering results in the formation of large particles or a film/sheet on the support surface. This causes the catalytic surface area of the resultant supported catalyst system to be less than that of the discrete nanoparticles by a few orders of magnitude.

Electrospinning is a process of applying a high voltage to produce an interconnected membrane like web of small fibers with diameters in the nanometer range. This technique has been reported to be successfully utilized in the generation of thin fibers and the fabrication of large surface area membranes from a broad range of polymers, including engineering plastics, biopolymers, conducting polymers, block copolymers and polymer blends. The challenge in electrospinning processes is to control the process parameters to minimize the fiber diameter. Earlier studies have reported the formation of nanofibers with fiber diameters of the order of a few hundreds of nanometres. To date, however, there has been little success in forming ultrafine metal oxide nanofibres such as those having an average diameter of less than 100 microns.

SUMMARY OF THE INVENTION (A) Surface Treatment of Foils

In a first aspect, an object of the present invention to provide a process for the surface treatment of aluminum and aluminum alloys which overcomes the difficulties known in the art.

It is a further object of the present invention to provide a method for producing a uniform nanoporous etched surface on an aluminium foil having an oxide layer of micrometric thickness.

It is a further object of the present invention to provide a simple one-step chemical surface treatment for an aluminum foil surface using a strong acid and strong oxidant.

It is a further object of the present invention to provide a one-step electro-less chemical anodization process which may be conducted at ambient temperature.

The effectiveness of several strong acids, such as sulphuric acid ($H_2SO_4$), ortho-phosphoric acid ($H_3PO_4$) and nitric acid ($HNO_3$) were evaluated in accordance with the present invention. Furthermore, due to relative abundance, environmentally friendly and less toxicity, hydrogen peroxide was selected and evaluated as a preferred oxidant in accordance with the present invention.

In a first aspect, the invention pertains to a method for the surface treatment of aluminium and aluminum alloys by a one-step electro-less chemical anodization process which is conducted at ambient temperature, where the aluminum surface is treated with a mixture of a strong oxidant and an acid to form a nano-porous etched surface having an oxide layer. The surface can serve as a support or carrier for a variety of catalytic inorganic materials of nanometric size.

In a further aspect of the invention, there is provided a process for the surface treatment of an aluminium foil comprising the steps of: applying an etching solution to chemically etch at least one surface of the foil to form an etched surface, and forming an aluminium oxidized coating on the etched surface.

In a further aspect, the etching solution comprises an aqueous solution including an oxidant and an acid selected from the group consisting of sulfuric acid, orthophosphic acid and nitric acid, the acid being present in the solution in a concentration selected at from about 5.4 M to 9.4 M, and preferably about 7.5+\-0.2 M.

In a further aspect, there is provided a method of surface treatment of aluminium foil and aluminium foil alloys which includes: cleaning the aluminium foil with acetone, air drying the foil and thereafter thoroughly washing with deionized water; dipping the foil into an oxidizing solution containing a strong acid and a strong oxidant for a specified time under ambient conditions. The foil being dipped into the oxidizing solution so that both sides of the foil are uniformly coated and subsequently treated; and removing the foil from the oxidizing solution after a specified time and washing thoroughly in deionized water and subsequently air drying at room temperature.

In yet a further aspect, there is provided a method characterized by a one-step electro-less chemical anodization process which is conducted at ambient temperature.

In yet a further aspect, there is provided a chemical etching process for an aluminum foil surface and subsequent formation of an aluminum oxide coating on the surface of the foil in a single step.

The process according to the present invention is particularly suitable for chemical anodization (chemical etching followed by surface oxidation) of very thin aluminum foil ($\geqq 11$ micrometer ($\mu m$)) without affecting the subsurface aluminum layers (core of the material). Additionally, the method in accordance with the present invention maintains the flexibility of very thin aluminum foils ($\geqq 11$ $\mu m$) after anodization.

In yet a further aspect, the anodization process in accordance with the invention only affects approximately 0.8 $\mu m$ from both external surfaces of the aluminum foil with a thickness, including but not limited to, 11 $\mu m$ and more preferably only 0.5 $\mu m$ from both external surfaces of the aluminum foil.

In yet a further aspect, there is provided an aqueous solution for controlled surface etching of aluminum that creates a uniform nano-porous etched surface having an oxide layer of micrometric thickness. The solution being a combination of a strong acid including but not limited to sulfuric acid ($H_2SO_4$), orthophosphic acid ($H_3PO_4$) or nitric acid ($HNO_3$) with concentrations ranging from 2.4M to 11.4M and a strong oxidant including but not limited to hydrogen peroxide ($H_2O_2$) from 8% to 22% (percentages herein are expressed as weight percentages) and preferably from 12% to 18%.

Controlled reaction was achieved with $H_2SO_4$ concentrations of less than 9.4 M. However, the reactions at concentrations less than 5.4M preceded at slower reaction rates. To achieve more desirable reaction rates, the acid concentrations preferably were maintained within a given concentration range between 2.4M to 11.4M, and preferably between 5.4M to 9.4M and most preferably between 6.5M to 8.5M.

The higher the level of oxidizing agent ($H_2O_2$) in the aqueous solution, the higher the oxide content was produced and the weight loss of the foil was decreased. A high acid-to-oxidant ratio in the etching solution resulted in dissolution of the oxide film surface. In a preferred aspect of the invention, an acid-to-oxidant ratio was 0.5-0.9 mole of oxidant per mole of acid and more preferably 0.6.-0.85 mole of oxidant per mole of acid and most preferably 0.7-0.8 mole of oxidant per mole of acid.

In accordance with the present invention, the etching characteristics and the extent of oxide coating can be varied by controlling either of the following four reaction parameters: (a) acid strength (b) oxidant concentration (c) acid-to-oxidant ratio and (d) contact time or dipping time.

In yet a further aspect, the treatment in accordance with the invention results in no more than 5 to 20% and preferably 10-15% weight-loss, and an oxide content of 2-8 wt % and more preferably 4-6 wt %.

In yet a further aspect, the surface etching process forms nano pores having a diameter between 50-450 nm, preferably 100-300 nm, and a depth of 100-350 nm and preferably 150-300 nm in aluminum foils about $\geqq 11$ $\mu m$ without substantially affecting the subsurface aluminum layers (core of the aluminum material).

In yet a further aspect, the present invention provides a single step treatment of both surfaces (sides) of the aluminum foil, whereby the surface etching process does not affect the foil to a depth of more than about 1 $\mu m$ (with the subsurface layers below that level being unaffected).

In yet a further aspect, an etched surface of an aluminium foil in accordance with the present invention has a near uniform layer of oxide coating. In yet a further aspect, the uniform oxide layer comprises approximately 5% (by weight) oxide.

The effectiveness of the surface treatment process according to the present invention was observed to be affected by the aluminum content (or the content of other ingredients (herein denoted as impurities)) of the aluminum foil. Under identical treatment condition, the effectiveness of the treatment in according to the present invention was lower in an aluminum foil with a lower aluminum content (or higher impurity content). The treatment was validated for aluminum foils having aluminum content as low as 72%. The inventors have also experimentally confirmed that a surface treatment including a solution comprising 7.5M sulfuric acid and 18% $H_2O_2$ with a contact time of 30 minutes with an aluminum foil bearing 91% aluminum, resulted in no more than 15% weight loss and oxide content of no less than 5%.

(B) Production of Ultrafine Metal Oxide Nanofibres

In another aspect of the invention, an object is to provide optimized electrospinning parameters for producing metal oxide fibres with diameters in order of tens of nanometers. The primary advantage of producing supported nanofiber catalyst with finer diameter is their high surface area which is comparable to discrete nanoparticles.

It is a further object of the invention to provide an optimization of electrospinning parameters for producing immobilized nanocatalyst of transition metal and its alloy. The immobilized nanofibers produced under the optimum setting of electrospinning parameters in accordance with this invention has an ultrafine diameter and thereby has the advantage of enhanced surface area of discrete nanoparticles by virtue of their nanometric dimensions. The generation of ultrafine immobilized nanofibers described in this invention allows the use of a supported metal catalyst without the limitation associated with using nanoparticles in a slurry.

In a second aspect, there is provided a method of producing an ultrafine immobilized transition metal oxide catalyst, including but not limited to titanium dioxide, having an average diameter selected at less than about 100 nm, preferably 16 to 80 nm, and most preferably about 44±14 nm without surface aggregation and loss of surface area.

In yet a further aspect, there is provided a method of producing an immobilized transition metal nanofibre using an electrospinning apparatus having a spinning tip, said method including the steps of, mixing an organo-metallic salt of a transition metal with a low boiling solvent mixture and polymer solution, the polymer solution having an average viscosity selected at between about 110 cp to 180 cp, preferably 130 cp to 160 cp, providing the spinning tip at a location spaced from a support surface, electrospinning the resultant mixture from the spinning tip onto a support surface in an environment substantially isolated from external air currents.

In yet a further aspect, there is provided an immobilized transition metal oxide nanocatalyst, including but not limited to titanium dioxide, with a high surface comparable to that of discrete nanoparticles.

In yet a further aspect, there is provided a transition metal oxide nanocatalyst, including but not limited to titanium dioxide, which is immobilized on a support surface and thereby are not associated with the limitations caused by particle aggregation of an unsupported catalysts in wet conditions (suspension or slurry). The specific surface area of the immobilized catalyst in accordance with this invention, in dry conditions and in wet conditions, is similar.

In yet a further aspect, there is provided an immobilization of transition metal oxide nanocatalysts, including but not limited to titanium dioxide, on the surface of a conducting support, including but not limited to aluminum, a nanoporous surface of a support, including but not limited to anodized or surface etched aluminum support surface etched in accordance with this invention and non-conducting surface, including but not limited to glass.

In yet a further aspect, there is provided a method of producing ultrafine nanofibers of transition metal oxide, including but not limited to titanium dioxide, of less than 100 nm to about 16 nm±5 in diameter, through statistical optimization of process variables of electrospinning using statistical experimental design, including but not limited to Box-Benkhen design, multiple regression analysis, analysis of variance and response surface methodology, either individually or in combination.

In yet a further aspect, there is provided a method which includes the use of a statistical model for predicting the diameter of a transition metal oxide (including but not limited to titanium dioxide) nanofibers generated by an electrospinning process. The model involves process variable of the electrospinning process, including potential difference across terminal (voltage, kV), infusion rate of electrospinning solution (flow rate, ml/h) and separation distance of electrodes (separation distance of electrodes, cm). The model predicts the average diameter of the metal oxide (including but not limited to titanium dioxide) fiber in units of length (including but not limited to nm). The model also predicts for the average titanium dioxide fiber diameter is as follows:

Average fiber diameter (nm)

$$=308.9-11.3\times(kV)-1.0\times(ml/h)-2.4\times(cm)+0.15\times(kV)^2+0.04\times(cm)^2$$

(a) nm=Nanometers (Average fiber diameter)
(a) kV=Kilovolts (Voltage)
(b) ml/h=milliliters/hour (Flow rate)
(c) cm=centimeters (Separation distance of electrodes)

In yet a further aspect, there is provided a method which includes a statistical model for predicting the average diameter of the metal oxide (including but not limited to titanium dioxide) fiber in units of length (including but not limited to nm) being 99% accurate and having a $R^2$ value of the model is 0.9763.

The inventors have examined the effects of the electrospinning process variables on the diameter of the metal oxide nanofibers by using statistical (including but not limited to analysis of variance) and graphical techniques (including but not limited to three dimensional surface plots and contour plots). The analysis reports the existence of statistically significant (greater than 5% level of significance) linear and quadratic effect of the electrospinning variables on the average diameter of the titanium dioxide nanofibers.

In yet a further aspect, there is provided a method of producing ultrafine nanofibers of transition metal by electrospinning a solution, prepared by mixing an organo-metallic salt (acetate or isopropionate) of the transition metal in a low-boiling solvent or solvent mixture (not limited to dimethylformamide, tetrahydrofuran, methanol, glacial acetic acid or their mixtures) along with a polymer (including but not limited to polyvinyl acetate (PVAc)) at optimum setting of the electrospinning variables and thereafter programmed thermal conditioning of the nanofibers.

In yet a further aspect, there is provided a method of identifying the optimum settings of electrospinning process variables for generating ultrafine nanofibers of a transition metal oxide (including but not limited to titanium dioxide) with diameter as low as 25 nm and more preferably 16 nm (after thermal degradation of the polymer co-ingredient). In a preferred method, the optimum setting of electrospinning process variables for generation of ultrafine nanofibers are between 20 kV to 60 kV, preferably about 35 to 45 kV and most preferably 40 kV of potential difference across the electrodes, about 0.6 to 2.0, preferably 1.0 to 1.4 and most preferably 1.2 milliliters per hour infusion rate, and about 22 to 42, preferably 28 to 36 and most preferably 32 cm of separation distance between electrodes.

In yet a further aspect, there is provided a method of preparing a polymer solution (preferably not less than 45% (w/v) polymer content) with an average viscosity of about 147 centipoise (cp) (no less than 130 cp and no more than 160 cp). The polymer being used as a carrier for the organo-metallic salt and to maintain the fiber-forming viscosity in the electrospinning process, by dissolving polyvinyl acetate (of average molecular weight not less than 50,000 dalton) in 3:2 volumetric mixture of dimethylformamide and tetrahydrofuran.

In yet a further aspect, there is provided a process for the preparation of a titanium dioxide sol solution by dissolution of titanium tetraisopropoxide (TTIP) into glacial acetic acid in 1:4 mole-per-mole ratio. The titanium dioxide sol solution is thereafter mixed with polyvinyl acetate solution for electrospinning ultrafine nanofibers at optimum setting of electrospinning process variables.

In yet a further aspect, there is provided a method and process of producing ultrafine metal oxide nanofibers, including but not limited to nickel oxide nanofibers or cobalt oxide nanofibers, by electrospinning a solution formed by dissolving metal acetate (including but not limited to nickel acetate or cobalt acetate) in glacial acetic acid in 1:100 mole-per-mole ratio and mixing with polyvinyl acetate solution.

In yet a further aspect, there is provided a method and process of producing ultrafine metal oxide nanofibers, including but not limited to zinc oxide, by electrospinning a solution formed by dissolution of metal acetate (including but not limited to zinc acetate) in dimethylformamide at 1:15 molar ratio and mixing the solution with polyvinyl acetate solution.

In yet a further aspect, there is provided a method of producing uniform ultrafine metal oxide (including but not limited to titanium dioxide, zinc oxide, nickel oxide, cobalt oxide) nanofibers or nanofibers of their alloys from a precursor composite nanofiber formed by electrospinning a solution in accordance with this invention, either individually or in combination with a further a solution in accordance with this invention. The precursor composite nanofiber subsequently undergoing a post-electrospinning thermal treatment process. The post-electrospinning thermal treatment being defined by a temperature program comprising of an initial vacuum drying of the composite nanofiber followed by slow calcination in air. The programmed drying in vacuum and then slow calcination in air eliminates the polymer backbone from the nano-composite fiber leaving an immobilized metal oxide nanofiber catalyst onto the surface of the support material. The vacuum drying step comprises of drying at temperature no less than 105° C. for a time no less than 2 hours under a vacuum of 600 mm Hg. The slow calcination includes controlled heating of the vacuum dried specimen in an atmospheric temperature programmable oven up to 300° C. and thereafter atmospheric calcining in a muffle furnace to 400° C. and holding at temperature between 340-550° C., preferably at 400° C. for a period of time no less than 3 hours.

In yet a further aspect, there is provided a method of producing ultrafine metal oxide (including but not limited to titanium dioxide) nanofibers with a normal distribution of fiber diameter. The fiber diameter range from 16 to 80 nm, with a preferable mean (average) fiber diameter of about 44 nm, modal fiber diameter of about 40 nm and a standard deviation of about 14 nm. Experimental confirmation has achieved 16 nm diameter titanium oxide fibers.

In yet a further aspect, there is provided a process of producing metal oxide (including but not limited to titanium dioxide) nanofibers with specific surface area as high as 259±22 square meter per gram ($m^2/g$).

In yet a further aspect, the specific surface area of the metal oxide nanofibers (including but not limited to titanium dioxide nanofibers) is reduced with increasing organo-metallic salt (including but not limited to titanium tetraisopropoxide) content in the electrospinning solution in accordance with the invention.

Further aspects of the invention will become apparent upon reading the following detailed description and drawings, which illustrate the invention and preferred embodiments of this invention.

BRIEF DESCRIPTION OF THE DRAWINGS

(FIG. 2B) 7.5M; and (FIG. 2C) 9.4M on 11 micron foil with 12% $H_2O_2$, treated for 20 minutes.

(FIG. 4B) 15%; and (FIG. 4C) (C) 18% on 11 micron foil with 7.5M $H_2SO_4$, treated for 20 minutes.

FIG. 6B 20 minutes; and (FIG. 6C) 30 minutes on 11 micron foil with 7.5M $H_2SO_4$ and 20% $H_2O_2$ solution treated for 20 minutes.

(FIG. 9B) Anodized with 7.5M $H_2SO_4$, 18% $H_2O_2$ and treated for 30 minutes.

(FIG. 10B) Anodized with 7.5M $H_2SO_4$, 18% $H_2O_2$ and treated for 30 minutes.

(FIG. 11B) Method in accordance with the present invention with 7.5M $H_2SO_4$, 18% $H_2O_2$ treated for 30 minutes.

(FIG. 12B) Al: 83%, C: 1%, Fe: 15%; (FIG. 12C) Al: 72%, C: 1%, Fe: 26% with 7.5M $H_2SO_4$, 18% $H_2O_2$ treated for 30 minutes.

(FIG. 15A) 3D surface plot of response for infusion rate and potential difference; (FIG. 15B) 3D surface plot of response for potential difference and separation distance; and (FIG. 15C) 3D surface plot of response for infusion rate and separation distance.

FIG. 20 is a graphical representation of the effect on increasing Ti-content on specific surface area and diameter of nanofibers.

DETAILED DESCRIPTION OF THE INVENTION (A) Surface Treatment of Foils

A method of surface treating an aluminum foil in accordance with the invention was conducted and includes the following exemplary steps:
1. The aluminum foil surface was cleaned with acetone, then dried in air and thereafter thoroughly washing with deionized water.
2. The aluminum foil was then dipped into an oxidizing solution containing a strong acid and a strong oxidant, as more fully detailed below, for a specified time, as more fully detailed below, under ambient conditions. The foil being dipped into the oxidizing solution so that both sides of the foil are uniformly coated and subsequently treated.

3. The aluminum foil was then removed from the oxidizing solution after the specified time and was washed thoroughly in deionized water and subsequently air drying at room temperature.

A scanning electron microscope (SEM) was used to determine an image of the foil surface. The image of the surface showed that it was covered with nanopores ranging from 100-300 nm in diameter. The cross-sectional view showed the existence of nano-tunnel from the surface. The depth of the pores was estimated to be between 150-300 nm. The cross-sectional view of the treated aluminum foil showed that 1 micrometer from either surface was affected in the treatment process. The core of the foil was not affected. Approximately 15-20% loss of weight of the foil was recorded in the process. Energy dispersive X-Ray (EDX) was conducted to determine the extent of oxide coating on the surface of the foil. The EDX method showed an association of around 5% (by weight) of oxygen on average on the foil surface.

Figure 1:
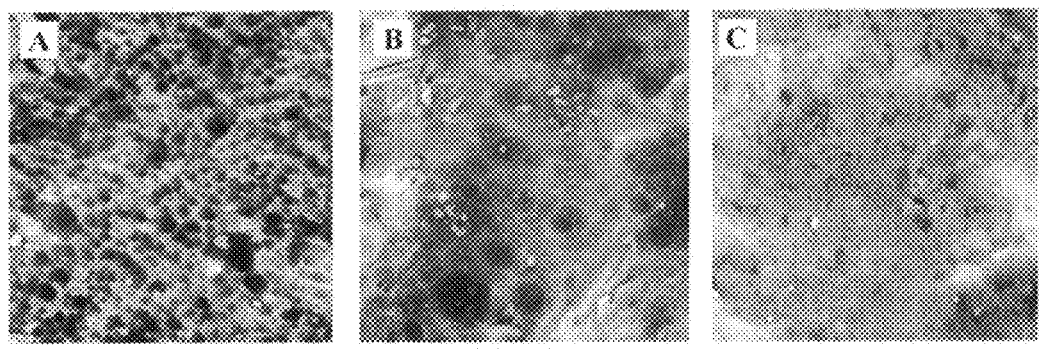
FIGS. 1A, 1B, and 1C show SEM images of a foil surface treated in accordance with the present invention with the acids $H_2SO_4$ (FIG. 1A); $H_3PO_4$ (FIG. 1B); and $HNO_3$ (FIG. 1C) on 11 micron foil with 5.4M acid and 15% $H_2O_2$ solution, treated for 30 minutes.

Reference may now be made to FIGS. 1A to 1C which show the extent of anodization with different strong acids, FIG. 1A $H_2SO_4$; FIG. 1B $H_3PO_4$; and FIG. 1C $HNO_3$ on an 11 micron aluminum foil with 5.4M acid and 15% $H_2O_2$, treated for 30 minutes.

FIGS. 1A to 1B show that under identical conditions, sulphuric acid is most effective in anodizing the aluminum foil among the other strong acids evaluated. Oxygen (O) content (by weight) was approximately 0.3% for foils treated with $H_3PO_4$ or $HNO_3$ and approximately 2% for foils treated with $H_2SO_4$. Atomic force microscopic (AFM) study showed that the surface substructures were in the order of 50 nm for foil treated with $HNO_3$, 75 nm for that of $H_3PO_4$ and over 100 nm in the foil treated with $H_2SO_4$. The results rationalize the etching bath constituents, $H_2SO_4$ and $H_2O_2$.

Figure 2:
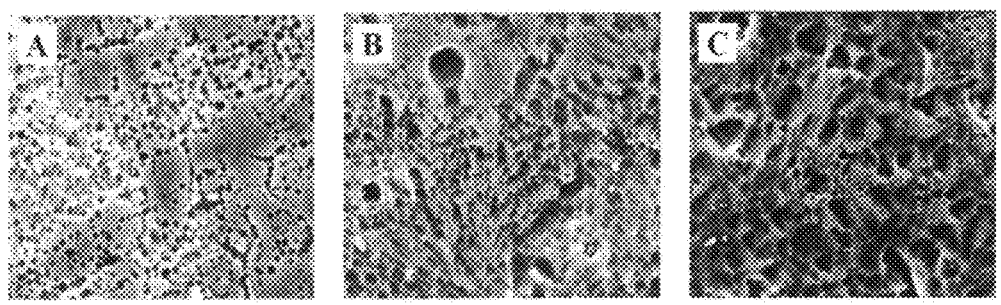
FIGS. 2A, 2B and 2C show SEM images of a foil surface treated in accordance with the present invention with different concentrations of sulphuric acid ($H_2SO_4$) (FIG. 2A) 5.4M.
Figure 3:
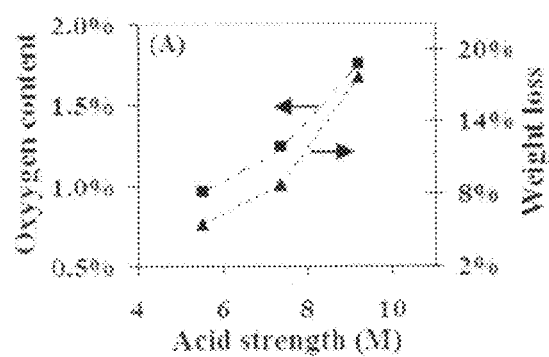
FIG. 3 shows a graphical representation of the oxygen-content and weight-loss for foils treated with different molarities of sulphuric acid on 11 micron foil with 12% $H_2O_2$, treated for 20 minutes.

Reference may now be made to FIGS. 2A to 2C which show the extent of anodization with different concentration of sulphuric acid $H_2SO_4$, FIG. 2A at 5.4M; FIG. 2B at 7.5M; and FIG. 2C at 9.4M on 11 micron foil with 12% $H_2O_2$, treated for 20 minutes. Reference may also now be made to FIG. 3 which graphically shows the oxygen-content and weight-loss for foils treated with different molarities of sulphuric acid on 11 micron foil with 12% $H_2O_2$, treated for 20 minutes.

Different concentrations of $H_2SO_4$ at 5.4M, 7.5M and 9.4 M (moles/1) were examined with respect to the anodization efficiency, the results of which can be see in FIGS. 2A to 2C and 3 respectively. Increasing sulphuric acid concentration (molarity (M)) did not increase the O-content by a large amount but caused a significant loss of foil-weight, due to pronounce sub-surface etching. Due to increasing vigorousness, the reactions at higher $H_2SO_4$ concentration (higher than 9.4M) were not controllable. No observable change was observed in samples treated with $H_2SO_4$ concentration less than 5.4M.

Figure 4:
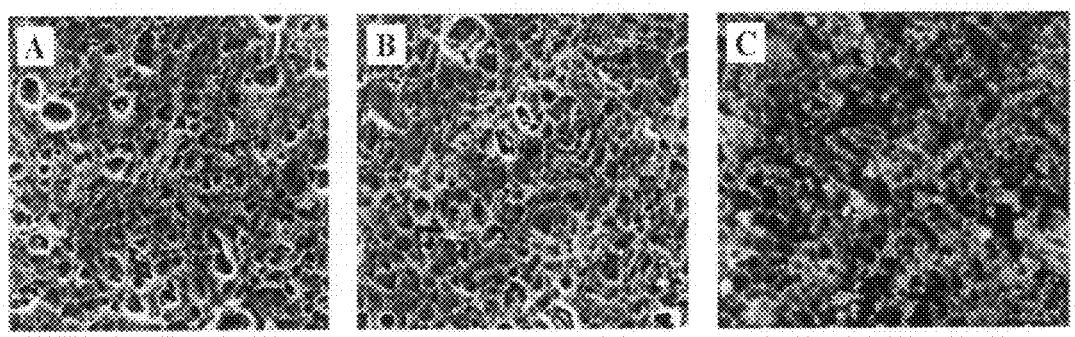
FIGS. 4A, 4B and 4C show SEM images of a foil surface treated in accordance with the present invention with different concentration of hydrogen peroxide ($H_2O_2$) (FIG. 4A) 12%.
Figure 5:
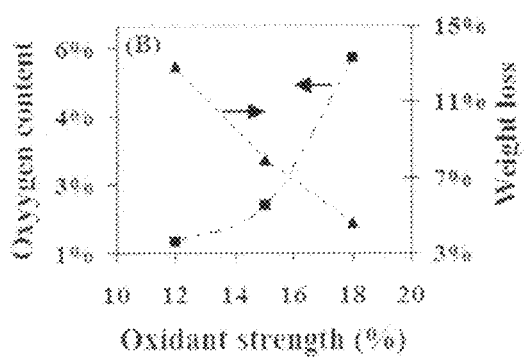
FIG. 5 shows a graphical representation of the oxygen-content and weight-loss for foils treated with different concentration of $H_2O_2$ on 11 micron foil with 7.5M $H_2SO_4$, treated for 20 minutes.

Reference may now be made to FIGS. 4A to 4C which show the extent of anodization with different concentration of hydrogen peroxide $H_2O_2$, FIG. 4 A at 12%; FIG. 4B at 15%; and FIG. 4C at 18% on 11 micron foil with 7.5M $H_2SO_4$, treated for 20 minutes. Reference may also now be made to FIG. 5 which graphically shows the oxygen-content and weight-loss for foils treated with different concentration of $H_2O_2$ on 11 micron foil with 7.5M $H_2SO_4$, treated for 20 minutes.

Similarly, the oxidant ($H_2O_2$) content of the anodization bath was optimized against three $H_2O_2$ concentrations (%, (w/v)), 12%, 15% and 18% (w/v) under identical experimental conditions shown in FIGS. 4A to 4C. Higher O-content and lower weight loss was observed in samples treated with higher concentration of $H_2O_2$ as shown in FIG. 5. More uniformity was observed in surface texture of the samples treated with higher $H_2O_2$ concentration. A ratio of 0.7-0.8 mole of $H_2O_2$ per mole of acid was identified as the ideal for in-situ chemical anodization of aluminum foil. Excess $H_2SO_4$ was required to initiate the etching process at the initial phase of the anodization, but too much $H_2SO_4$ results in dissolution of the oxide film from the aluminum surface.

Reference may now be made to FIGS. 6A to 6C which show the extent of anodization under different contact time, FIG. 6A at 10 minutes; FIG. 6B at 20 minutes; and FIG. 6C at 30 minutes on 11 micron foil with 7.5M $H_2SO_4$, 20% $H_2O_2$ and treated for 20 minutes. Reference may now be made to FIG. 7 which graphically shows the oxygen-content and weight-loss for foils treated with a chemical anodization solution and different contact times on 11 micron foil with 21% $H_2O_2$ and 5.4M $H_2SO_4$.

Figure 6:
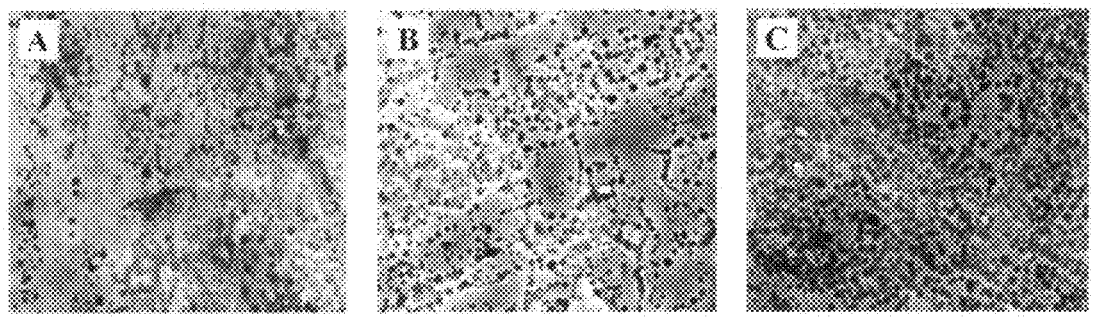
FIGS. 6A, 6B and 6C show SEM images of a foil surface treated in accordance with the present invention under different contact times (FIG. 6A) 10 minutes.
Figure 7:
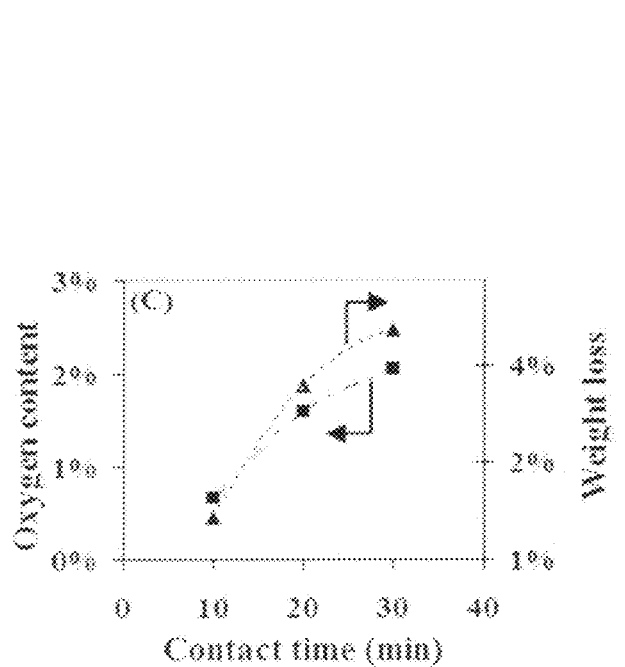
FIG. 7 shows a graphical representation of the oxygen-content and weight-loss for foils treated with a chemical anodization solution and different contact times [on 11 micron foil with 21% $H_2O_2$ and 5.4M $H_2SO_4$].

The SEM images shown in FIGS. 6A to 6 C reveal the progression of anodization on the aluminum surface. Increasing contact time increases the O-content of the film. But the anodization tends to level beyond 20 minutes of contact time (see FIG. 7). A similar trend was noted for the weight loss of the foil. Based on the observations of the optimization study, the most effective anodization was reported when aluminum was treated with 7.5M $H_2SO_4$ and 18% $H_2O_2$ for 30 mins.

Figure 8:
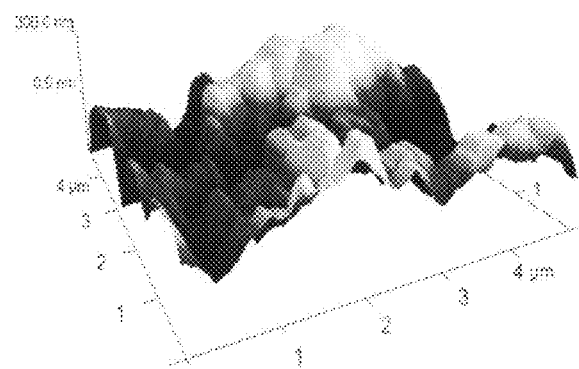
FIG. 8 shows an AFM image of an anodized aluminum treated in accordance with the present invention under conditions of a 7.5M $H_2SO_4$ and 18% $H_2O_2$ solution treated for 30 minutes.

Reference may now be made to FIG. 8 which shows an AFM 3-D image of anodized aluminum treated under preferred conditions with 7.5M $H_2SO_4$, 18% $H_2O_2$ and treated for 30 minutes. The AFM image shows that surface substructures in the order of approximately 200 nm.

Figure 9:
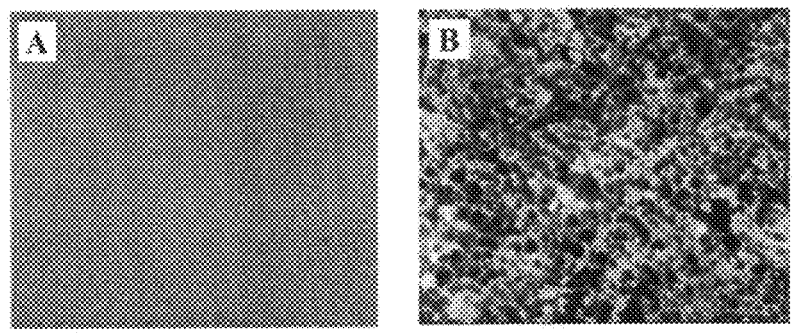
FIGS. 9A and 9B show SEM images of a foil surface treated under optimized condition (FIG. 9A) Untreated.
Figure 10:
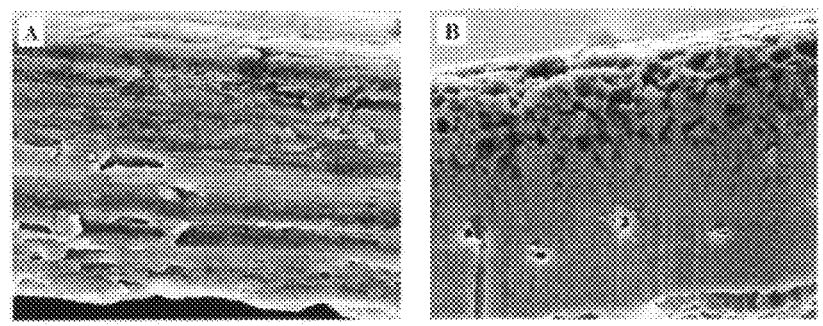
FIGS. 10A and 10B show SEM images of a cross-sectional view of an anodized aluminum treated under optimized condition (FIG. 10A) Untreated.

Reference may now be made to FIGS. 9A and 9 B which show images of anodized aluminum treated under the following conditions, FIG. 9A Untreated and FIG. 9B anodized with 7.5M $H_2SO_4$, 18% $H_2O_2$ and treated for 30 minutes. Reference may also now be made to FIGS. 10A and 10B which show images of the cross-section of anodized aluminum treated under the following conditions, FIG. 10A Untreated; and FIG. 10B anodized with 7.5M $H_2SO_4$, 18% $H_2O_2$ and treated for 30 minutes.

As shown in FIGS. 9A and 9B and 10A and 10B, the surface texture and cross-section of the anodized aluminum was examined and compared with the control (untreated) aluminum. A careful examination reveals that in this treatment anodization takes place only within 1 micrometer thickness from either surfaces of the foil. Under optimized conditions, anodization results in 5% weight loss and 5% oxygen content on the surface layer. Thus, this invention demonstrates a new method of chemically anodizing aluminum foil with minimum impact on the aluminum.

Figure 11:
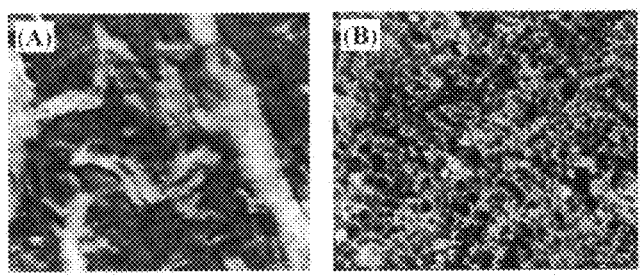
FIGS. 11A and 11B show SEM images of anodized aluminum treated under optimized condition (FIG. 11A) Galvanstatically anodized.
Figure 12:
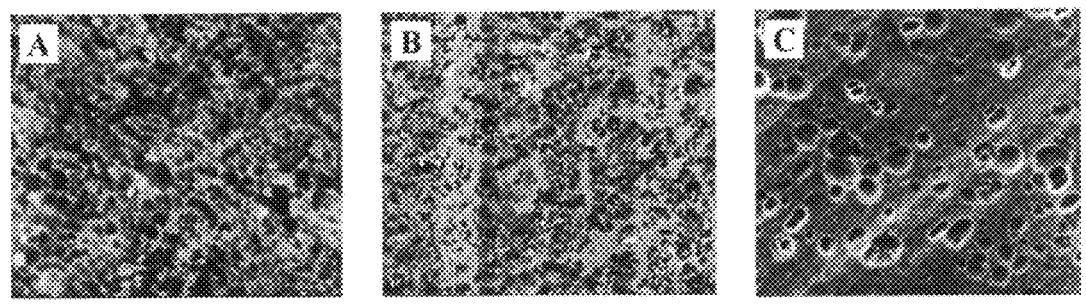
FIGS. 12A, 12B and 12C show SEM images of the extent of anodization in different aluminum alloys (FIG. 12A) Al: 91%, C: 5%, Fe: 3%.

Reference may now be made to FIGS. 11A and 11B which show images of anodized aluminum treated under the following conditions, FIG. 11A galvanstatically anodized; and FIG. 11B method of this work with 7.5M $H_2SO_4$, 18% $H_2O_2$ and treated for 30 minutes. Reference may also now be made to FIGS. 12A to 12 C which show the extent of anodization in different aluminum alloys, FIG. 12A Al: 91%, C: 5%, Fe: 3%; FIG. 12 B Al: 83%, C: 1%, Fe: 15%; and FIG. 12 C Al: 72%, C: 1%, Fe: 26% with 7.5M $H_2SO_4$, 18% $H_2O_2$ and treated for 30 minutes.

Comparison of the anodized foil, anodized by the method described herein method of this work with galvanostatically anodized foil illustrates that the formation of nanometric surface characteristics were much less pronounced in the galvanostatic method in comparison to the method reported in this work (see FIGS. 11A and 11B). The anodization was validated for different alloys of aluminum. The effectiveness of anodization was observed to decrease with increasing iron (Fe) content in the alloy (see FIGS. 12A to 12C).

(B) Production of Ultrafine Metal Oxide Nanofibres

The following details a preferred embodiment of the method and apparatus of producing immobilized nanocatalyst of transition metal oxides and their alloys in accordance with the invention.

Figure 13:
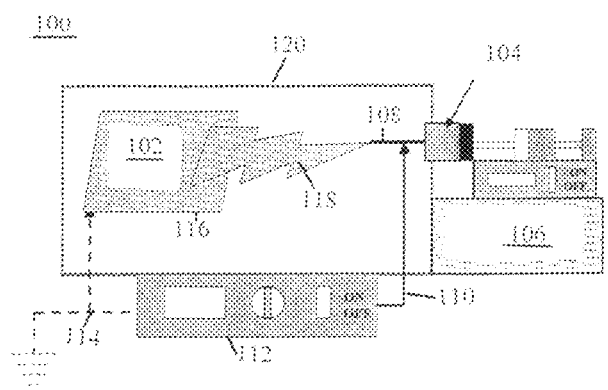
FIG. 13 shows substantially an electrospinning apparatus for nanofiber generation in accordance with this invention.

Reference may now be made to FIG. 13 which shows an apparatus 100 for nanofiber generation in accordance with this invention. The apparatus includes a pump 106, a spinning tip/needle 108, a variable high voltage DC power supply 112 and an enclosure 120.

(a) Preparation of the Metal Oxide Solution for Electrospinning
1. Polyvinyl acetate (PVAc) solution (45% w/v (weight/volume)) was prepared by dissolving PVAc of molecular weight 50,000 Daltons in (3:2) dimethylformamide-tetrahydrofuran mixture (viscosity: 147 cps at shear rate $\geq 10,000$ s$^{-1}$)
2. TiO$_2$ sol solution was prepared by mixing titanium tetraisopropoxide (TTIP) in glacial acetate acid (1:4 (mole/mole))
3. The electrospinning solution was prepared by mixing a prepared PVAc solution (step 1) with prepared TTIP solution (step 2) at specified ratios of weight to weight.

It is to be understood that the present invention is not to be limited to the particular electrospinning oxide solution detailed above, but rather other metal oxides and their alloys as described herein are equally applicable to the present invention.

(b) Description of Electrospinning Process
1. A needle 108 containing the prepared electrospinning solution 104 is placed in a pump 106, capable of delivering at a constant flow rate to the needle 108.
2. An aluminum foil support 102 having a thickness of 11 microns or electroless anodized aluminum foil was placed as cathode at a distance from the needle 108 containing the electrospinning solution 104 with the treated surface of the foil facing the needle 104.
3. A positive terminal 110 of a variable high voltage DC power supply 112, capable of delivering a high potential difference (0-50 kV), is connected to the metallic needle 108 and a negative or ground terminal 114 is attached to a collector surface 116 (cathode) of the aluminium foil 102.
4. The electrospinning apparatus 100 is placed inside an enclosure 120 and substantially sealed from external air currents.
5. The distance between the tip of the needle 108 and the surface of the aluminum foil is set at an optimum separation distance inside the enclosure 120.
6. The optimum infusion rate was set and optimum potential difference was applied across terminals 110 and 114 in accordance with the present invention.
7. Discontinuity of fiber formation in the electrospinning was observed below a potential difference of 25 kV and an infusion rate of 0.6 ml/h and above separation distance of 32 cm.
8. Dripping of solution was noted beyond the infusion rate of 3.2 ml/h.
9. Beyond the potential difference of 40 kV and below separation distance of 12.5 cm electrical short circuit (due to breakage of resistance barrier of air inside the enclosure) and sparks were observed between the electrodes.
10. Upon applying a high voltage to the solution 104, with the needle 108 tip being some distance away from the grounded collector surface 116, a fluid jet 118 is ejected from the needle 108 tip. As the jet 118 accelerates towards the cathode collector surface 116, the solvent in the solution 104 evaporates and a charged metal/polymer composite fiber is deposited on the collector surface 116 of the aluminum foil support 102 material.
11. The fine fibers delivered from the tip of the needle 108 is airborne to the target collector surface 116 in a random fashion.
12. The electrospinning process can be continued until the solution 104 in the syringe is diminished or until till the power supply to the system is turned off.

(c) Post Electrospinning Treatment
1. Upon completion of the electrospinning process, the mesh of composite nanofibers, comprising titanium oxide and polymer deposited on the support was collected and subjected to subsequent thermal treatment in accordance with the present invention.
2. The composite nanofiber is initially subjected to vacuum drying at temperature no less than 105° C. for a period of time no less than 2 hours under a vacuum of 600 mm Hg.
3. The polymer is removed and metal oxide fiber formation is facilitated by controlled heating of the vacuum dried specimen in an atmospheric temperature programmable oven up to 300° C. and thereafter atmospheric calcining in a muffle furnace to 400° C. and holding at temperature between 340-550° C., preferably at 400° C., for a period of time no less than 3 hours (sufficient to pyrolyze the PVAc and crystallize the amorphous TiO$_2$ in the nanofibers). The temperature of the muffle furnace must be kept below melting temperature of the aluminum foil of 600° C. or the crystal transformation temperature of the metal catalyst, whichever is lower.
4. Once the polymer is pyrolyzed, the support has pure metal oxide catalyst immobilized as nanofibers. The foil is allowed to cool to ambient temperature. Next a gentle blow of clean dry air is applied to remove the loose particles followed by a number of rinses in ultrapure water to remove the remaining polymer ash. The immobilized catalyst on the foil substrate is then dried at 105° C. to produce a clean immobilized catalyst.

Preparation of Support: a Surface of the Supporting Scaffolding/Material (treated aluminum sheet in a preferred construction) 102 is cleaned with acetone, thoroughly washed with deionized water and dried in air.

Preparation of electrospinning solution: The electrospinning solution 104 is prepared by mixing an organo-metallic salt (acetate or isopropionate) of the transition metal in a solvent or solvent mixture (not limited to dimethylformamide, tetrahydrofuran, methanol, glacial acetic acid) along with a polymer.

The purpose of the polymer is to behave as a carrier for the metal salt and to maintain the viscosity of the electrospinning solution which is needed for fiber formation. It is ideal for the viscosity of the polymer solution to be between about 130-160 cP for producing smooth fibres. Polyvinyl acetate (PVAc) is a polymer which degrades at 300° C. and chars around 400° C. This temperature is below the crystal transformation temperature of transition metal catalyst and the melting temperature of aluminum (600° C.). Thus, PVAc of molecular weight (Mw) 50,000 was used to prepare an electrospinning solution (45% PVAc (w/v)) of viscosity 147 cps (at shear rate ≧10,000 s$^{-1}$).

Electrospinning: In the electrospinning process, the viscous solution 104, containing the polymer and metal salt in the low boiling solvent, is delivered at a constant flow rate by the pump 106 to the metal capillary needle 108 connected to the positive (anode) terminal 110 of the variable high voltage DC power supply 112, capable of delivering high potential difference (about 0-50 kV). The negative or ground terminal 114 is attached to a collector surface (cathode) 116 of the support material 102. Upon applying a high voltage to the solution 104 and with the needle 108 tip being some distance away from the grounded collector surface 116, the fluid jet 118 is ejected from the tip of the needle 108. As the jet 118 accelerates towards the cathode collector surface 116, the solvent in the solution 104 evaporates and a charged metal/polymer composite fiber is deposited on the collector surface 116 of the support material 102.

The horizontal orientation of electrospinning apparatus 100 was chosen to minimize beading of fibres due to carry-over of excess spinning solution 104 and dripping of solution 104 onto the collector surface 116. The active section of the apparatus (capillary to collector) is enclosed in the sealed enclosure/chamber 120 to mitigate the advective exchange of charged ions with the surrounding air (produces draught of ionic wind) and to maintain a stable environment within the enclosure 120.

The applied electrical potential, separation distance of the terminals, solution viscosity and solution flow rate are the major process variables in controlling the diameter of the fabricated nano-composite fiber and subsequently, the diameter of the metal oxide fibres.

The electrospinning solution is infused from a metallic capillary under a specific set of parameters—potential difference (kV) infusion rate (ml/h), and collector-to-ground separation distance (cm). The charged jets ejecting from the tip of the capillary moves towards the collector ground and the composite nanofibers comprising of polymer and metallic salt are deposited on the surface of the scaffolding medium.

Programmed drying in vacuum and then slow calcination in air eliminates the polymer backbone from the nano-composite fiber leaving immobilized metal oxide nanofiber catalyst onto the surface of a support material.

Figure 14:
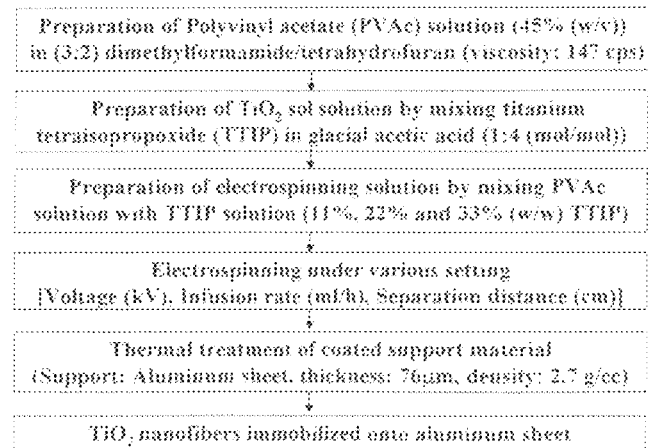
FIG. 14 is a flowchart identifying the steps in the generation of titanium dioxide nanofibers in accordance with this invention.

FIG. 14 shows a flowchart identifying the steps in the generation of titanium dioxide nanofibers in accordance with this invention. For nickel oxide and cobalt oxide fibres, nickel acetate and cobalt acetate were dissolved in glacial acetic acid in 1:100 mol ratio. For zinc oxide fiber, specific amount of zinc acetate was dissolved in dimethylformamide in a 1:15 mol ratio. In each case, PVAc was added to adjust the viscosity of the electrospinning solution so as to promote fiber formation.

Optimization of Electrospinning Parameters:

Experimentally, the optimum levels of electrospinning parameters can be located by a single factor optimization method. However, the minimization of the nanofiber diameter through a single factor optimization is often considered less advantageous than optimization using statistical experimental design. Hence, response surface optimization using three factor three levels Box-Benkhen design (BBD) was considered in optimization studies for electrospinning of nanofibers. The factor levels, tabulated in Table 1, were chosen based on preliminary experimentation. Discontinuity of fiber formation in the electrospinning was observed below the lowest potential difference (25 kV) and infusion rate (0.6 ml/h) and highest level of separation distance (32 cm). Dripping of solution was noted beyond the highest level of infusion rate (3.0 ml/h). Electrical sparks were observed between the electrodes beyond the highest level of potential difference (40 kV) and lowest level of separation distance (12.5 cm), due to breakage of resistance barrier of air inside the enclosure.

TABLE 1

Experimental factors and their levels

| Factors levels | Potential difference (kV) | Infusion rate (ml/h) | Separation distance (cm) |
|---|---|---|---|
| 1 | 25 | 0.6 | 12.5 |
| 2 | 32.5 | 1.8 | 22.5 |
| 3 | 40 | 3.0 | 32.5 |

Figure 15:
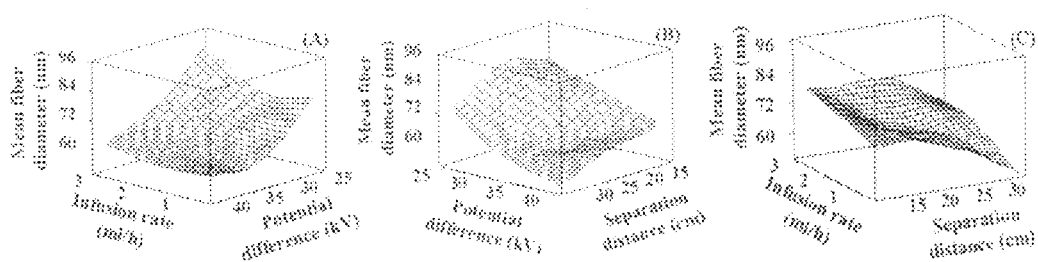
FIGS. 15A, 15B and 15C show three dimensional (3D) surface plots of the effect of BBD design factors on the response variable (mean fiber diameter (nm)).

Reference may now be made to FIGS. 15A to 15B which show the effect of BBD design factors on the response variable (mean fiber diameter (nm)). FIG. 15A showing a 3D surface plot of response for infusion rate and potential difference; FIG. 15B showing a 3D surface plot of response for potential difference and separation distance; and FIG. 15C showing a 3D surface plot of response for infusion rate and separation distance. Three dimensional (3D) surface plots of the response variable (diameter of nanofibers (nm)) for the experimental factors (two-factor-at-a-time) are presented in FIGS. 15A to 15C. The surface in the Figures is formed by connecting the points of equal response (equal mean fibre diameter). The 3D plots shows that at higher potential difference, higher separation distance is highly conducive for producing smaller diameter nanofibers. Further optimization analysis was performed to locate the region of minimum response. The numerical optimization function in the Minitab software, based on the D-optimality index, was used to locate the maximum response within the factor-space under evaluation. The D-optimality index varied between zero (worst case) and one (ideal case) for all the factors. The software searches for all possible factor settings and computes a value for the largest D-optimality value. A minimum response (mean fibre diameter) was recorded for 40 kV potential distance, 1.2 ml/h infusion rate and 32 cm separation distance. An analysis of variance (ANOVA) and multiple regression analysis were performed to derive a response surface model for the mean fiber diameter (nm) involving all three experimental factors, potential difference, infusion rate and separation distance (Eqn. 1).

TABLE 2

ANOVA table for the response (fiber diameter)

| Source | DF | Seq SS | Adj MS | F | P |
|---|---|---|---|---|---|
| Regression | 9 | 1671.1 | 185.678 | 22.86 | 0.002* |
| Linear | 3 | 1415.57 | 61.217 | 7.54 | 0.027* |
| Square | 3 | 225.92 | 75.305 | 9.27 | 0.017* |
| Interaction | 3 | 29.61 | 9.872 | 1.22 | 0.395 |
| Residual Error | 5 | 40.62 | 8.124 | | |
| Lack-of-Fit | 3 | 31.48 | 10.493 | 2.3 | 0.318 |
| Pure Error | 2 | | 9.14 | 4.57 | |
| Total | 14 | 1711.72 | | | |

*Statistically significant at 5% level of significance and are included in the model Fiber diameter (nm) = $308.9 - 11.3 \times (kV) - 1.0 \times (ml/h) - 2.4 \times (cm) + 0.15 \times (kV)^2 + 0.16 \times (ml/h)^2 + 0.04 \times (cm)^2$ (1)

Figure 16:
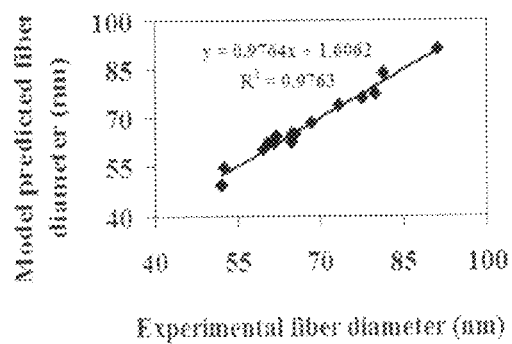
FIG. 16 is a comparison of the model output against experimental values.

Reference may now be made to FIG. 16 which graphically represents a comparison of the model output against experimental values. The model prediction was validated with the experimental values. The model prediction closely matches the experimental values at all levels of factor settings shown in FIG. 16.

Figure 17:
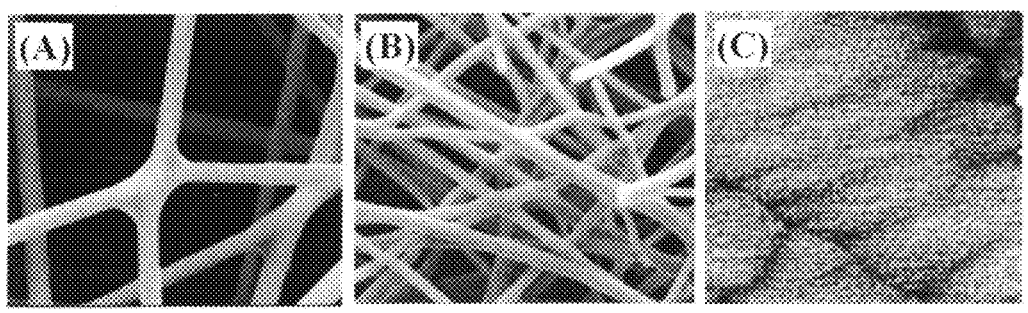
FIGS. 17A, 17B and 17C show images of immobilized nanofibers (FIG. 17A) $TiO_2$ nanofibres before calcination (SEM) (FIG. 17B) $TiO_2$ nanofibres after calcination (SEM) (FIG. 17C) Surface of $TiO_2$ nanofiber-sintered crystal (AFM).
Figure 18:
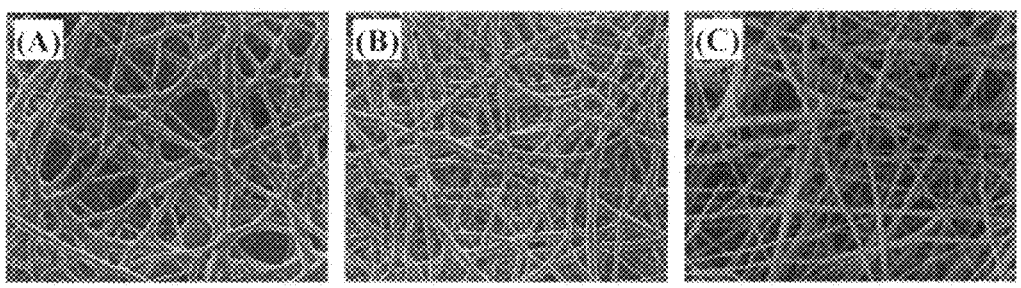
FIGS. 18A, 18B and 18C show SEM images of immobilized nanofibers before calcination (FIG. 18A) CoO, (FIG. 18B) NiO, (FIG. 18C) ZnO.

Reference may now be made to FIGS. 17A to 17C which show images of immobilized nanofibers, FIG. 17A showing SEM images of $TiO_2$ nanofibres before calcinations; FIG. 17B showing SEM images of $TiO_2$ nanofibres after calcinations; and FIG. 17C showing AFM surface images of $TiO_2$ nanofibers-sintered crystal. Reference may also now be made to FIGS. 18A to 18C which show SEM images of immobilized nanofibers before calcinations, FIG. 18A CoO; FIG. 18B NiO; and FIG. 18C ZnO. A scanning electron microscope (SEM) and atomic force microscope was used to image the nanofibers. Scandium image processing software was used to measure the diameter of the nanofibers. The SEM images revealed uniform nanofiber dimension under optimum electrospinning parameter settings.

Figure 19:
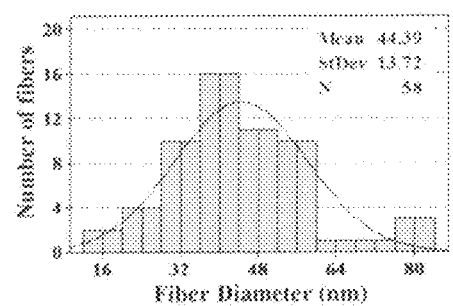
FIG. 19 is a histogram of $TiO_2$ nanofibers for different fibre diameters.
Figure 20:
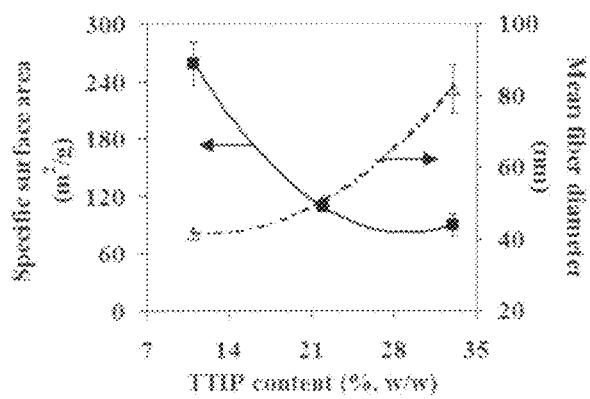

Reference may now be made to FIG. 19 which shows a histogram of $TiO_2$ nanofibers for different fibre diameters. Reference may also now be made to FIG. 20 which shows a graphical representation of the effect on increasing Ti-content on specific surface area and diameter of nanofibers. FIG. 19 shows the distribution of fiber diameter produced under optimum parameter setting in electrospinning process. The histogram of fiber diameter shows normal distribution. The fiber diameter ranged from 16 to 80 nm with an average of 44 nm (with standard deviation of 14 nm). Minimum fiber diameter registered was 16 nm. The reported fiber diameter is the smallest produced in any electrospinning process; particularly knowing that the minimum diameter of the available $TiO_2$ nanoparticles is approximately 5 nm (manufactured by Alfa Aesar, Wardhill, Mass.). FIG. 20 shows that increasing specific surface area was associated with the smallest diameter nanofibers. The maximum specific surface area recorded was $259\pm22$ $m^2/g$. The reported specific surface area is the highest reported surface area for any immobilized nanofiber catalyst. The figure also shows that increasing metal content increases the fiber diameter and thereby decreases the specific surface area of the immobilized catalyst.

The following publications describe various processes and apparatus, as related to aspects of the invention hertofor described, and the disclosures of which are hereby incorporated herein by reference:
1. Wegman. R. F. (1989). Surface preparation and techniques for adhesive bonding. Noyes Pub. Westwood, N.J. Chapter 2: Aluminum and aluminum alloys, pp 9-24.
2. Cakir O. (2008). J Mat Processing, 199, 337-340.
3. Sulka G. D. et. al. (2002). J. Electrochem. Soc. 149, 7, D97-D103.
4. U.S. Pat. No. 3,616,310
5. WO 2006/093553 A3
6. U.S. Pat. No. 4,395,305
7. U.S. Pat. No. 3,284,326
8. U.S. Pat. No. 3,802,973
9. U.S. Pat. No. 3,898,095
10. EP1475452 A2
11. US 2008/0149885 A1
12. U.S. Pat. No. 3,314,890
13. U.S. Pat. No. 3,407,141
14. U.S. Pat. No. 5,513,766
15. Fierro, J. L. G. (2006). Metal oxides: chemistry and application. CRC Press. Boca Raton, Fla. pp 31-48, 463-481.
16. Hagens, J. (2006). Industrial catalysis: A practical approach. $2^{nd}$ Edn. J. Wiley and Sons Inc. Weinheim, Germany. pp. 99-177.
17. Carp, O., Huisman, C. L., Reller, A. (2004). Photoinduced reactivity of titanium dioxide. Progress in Solid State Chemistry, 32, 33-177.
18. Hamid, M. A., Rahman, I. A. (2003). Preparation of Titanium Dioxide ($TiO_2$) thin films by sol gel dip coating method. Malaysian Journal of Chemistry, 5, 1, 086-091.
19. Ibañez, P. F., Malato, S., Enea, O. (1999). Photoelectrochemical reactors for the solar decontamination of water. Catalysis Today 54, 329-339.
20. Houari, M., Saidi, M., Tabet, D., Pichat, P., Khalaf, H. (2005). The Removal of 4-chlorophenol and Dichloroacetic Acid in Water Using Ti-, Zr- and Ti/Zr-Pillared Bentonites as Photocatalyst. American Journal of Applied Sciences 2, 7, 1136-1140.
21. Subbiah, T., Bhat, G. S., Tock, R. W., Parameswaran, S., Ramkumar, S. S. (2005). Electrospinning of Nanofibers. Journal of Applied Polymer Science, 96, 2, 557-569.
22. Li, D., Wang, Y., Xia, Y.; (2003). Electrospinning of Polymeric and ceramic nanofibers as uniaxially aligned arrays. Nano Letters, 3, 8, 1167-1171.
23. Viswanathamurthi, P., Bhattarai, N., Kim, C. K., Kim, H. Y., Lee, D. R. (2004). Ruthenium doped $TiO_2$ fibers by electrospinning. Inorganic Chemistry Communications, 7, 679-682.
24. Son, W. K., Cho, D., Park, W. H. (2006). Direct electrospinning of ultrafine titania fibres in the absence of polymer additives and formation of pure anatase titania fibres at low temperature. Nanotechnology, 17, 439-443.
25. WO 2001/027365 A1
26. EP 2031613 A2
27. US 2009/0068466
28. US 2007/0269655 A1
29. WO 2008/111960 A2
30. WO 2008/028194 A2
31. US 2008/0242178 A1
32. US 2008/0054221 A1
33. Cui, X. M., Nam, Y. S., Lee, J. Y., Park, W. H. (2008). Fabrication of zirconium carbide (ZrC) ultra-thin fibers by electrospinning. Materials Letters, 62, 12-13, 1961-1964.
34. Tappmeyer, W. P., Davidson, A. W. (1963). Cobalt and nickel acetates in anhydrous acetic acid. Inorganic Chemistry, 2, 4, 823-825.
35. U.S. Pat. No. 5,106,653
36. Rodriguez-Gattarno, G., Oskam, G. (2006). Forced hydrolysis vs. Self-hydrolysis of zinc acetate in ethanol and isobutanol. ECS Transactions, 3, 9, 23-28.
37. Myer, R. H., Montogomery, D. C. (2002). Response surface methodology: Process and product optimization using designed experiment, second ed., John Wiley and Sons, New York, 343-350.
38. Ray, S. RSM: A statistical tool for process optimization. Indian Textile Journal 117, (2006) 24-30.

Although this disclosure has described and illustrated certain preferred embodiments of the present invention, it is also to be understood that the invention is not restricted to these particular embodiments.

We claim:
1. A process for a surface treatment of an aluminium foil comprising the steps of:
applying an etching solution to chemically etch at least one surface of said foil to form an etched surface, said etching solution comprising an aqueous solution including an oxidant and an acid selected from the group consisting of sulfuric acid, orthophosphoric acid and nitric acid, said acid being present in said solution in a concentration selected at from about 5.4 M to 9.4 M, and wherein said oxidant comprises hydrogen peroxide present in said solution in an amount of about 12 wt % to 18 wt %, and forming an aluminium oxidized coating on said etched surface.

2. The process of claim 1, wherein said acid is present in said solution in a concentration selected at about 7.5 +\-0.2 M.

3. The process of claim 1 comprising simultaneously applying said etching solution to both surfaces of said foil as a single step treatment.

4. The process of claim 1, wherein said etching solution is applied for a time selected to form said etched surface into said foil to a depth of between about 150 to 300 nm.

5. The process of claim 4, wherein said etched surface comprises nano-pores having a mean pore diameter size selected at between about 100 to 300 nm.

6. The process of claim 1, wherein said step of chemical etching is conducted at ambient temperature.

7. The process of claim 1 including a step of applying a coating composition selected from a paint coating, a colour coating and an adhesion coating over said aluminium oxidized coating.

* * * * *